March 12, 1946. B. B. GRACE ET AL 2,396,462
MOUNTING JEWELS FOR INSTRUMENT BEARINGS
Filed June 12, 1943 3 Sheets-Sheet 3
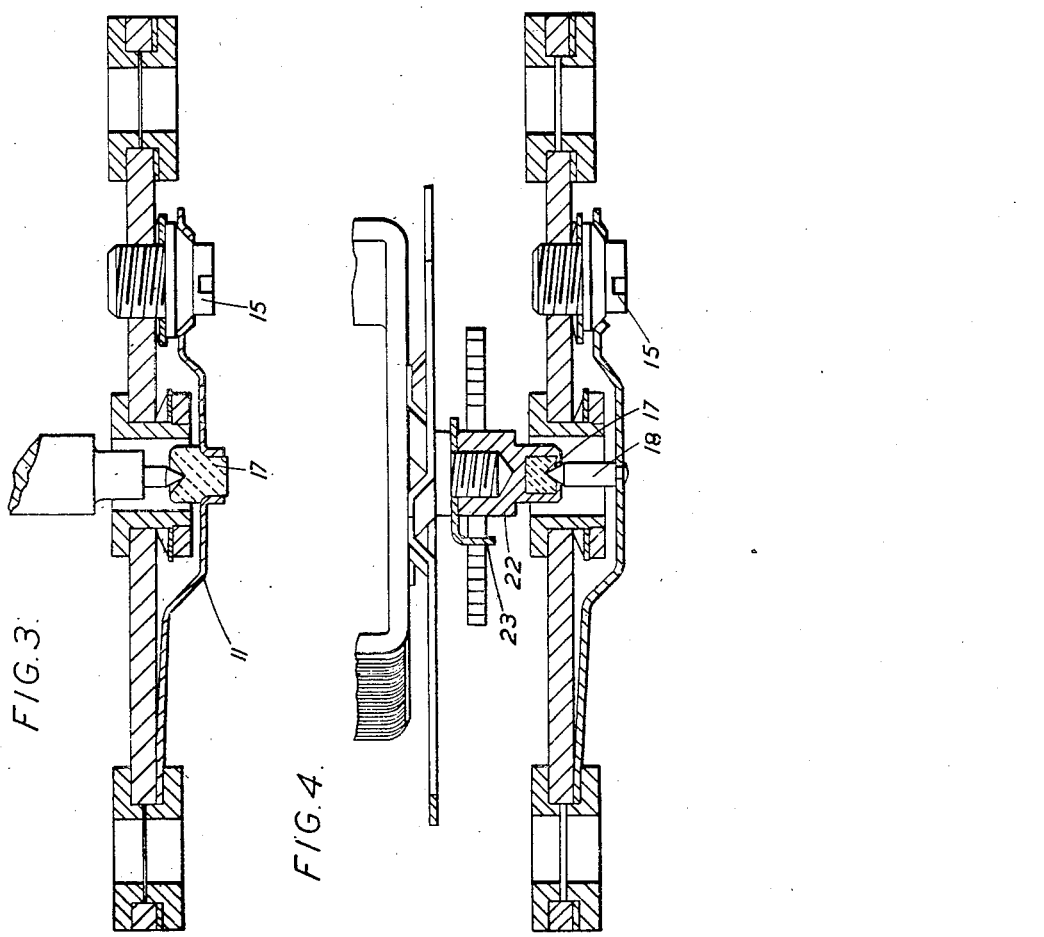
Inventor
B. B. Grace
E. Handley
G. Gulliver
By
Attorney Patented Mar. 12, 1946

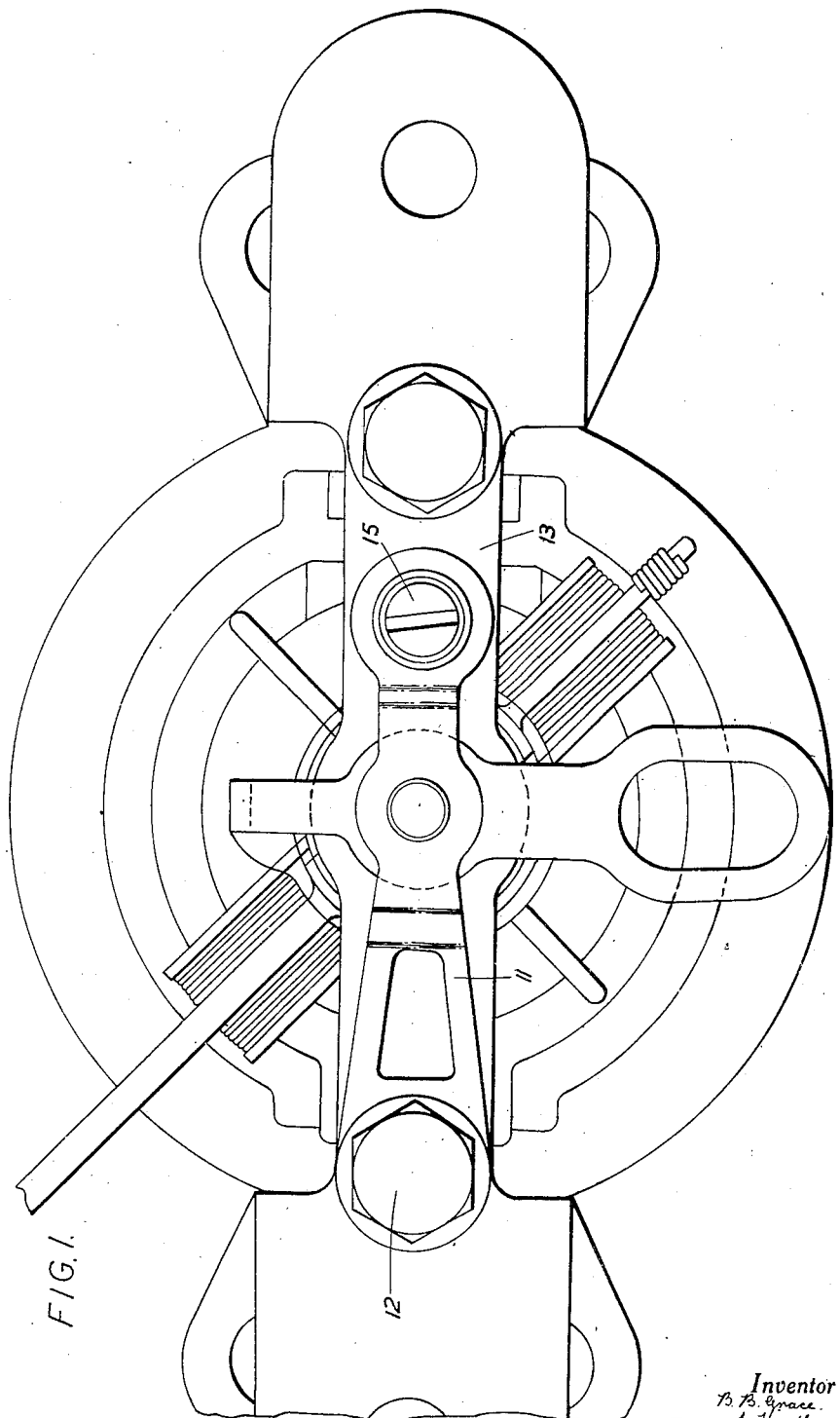

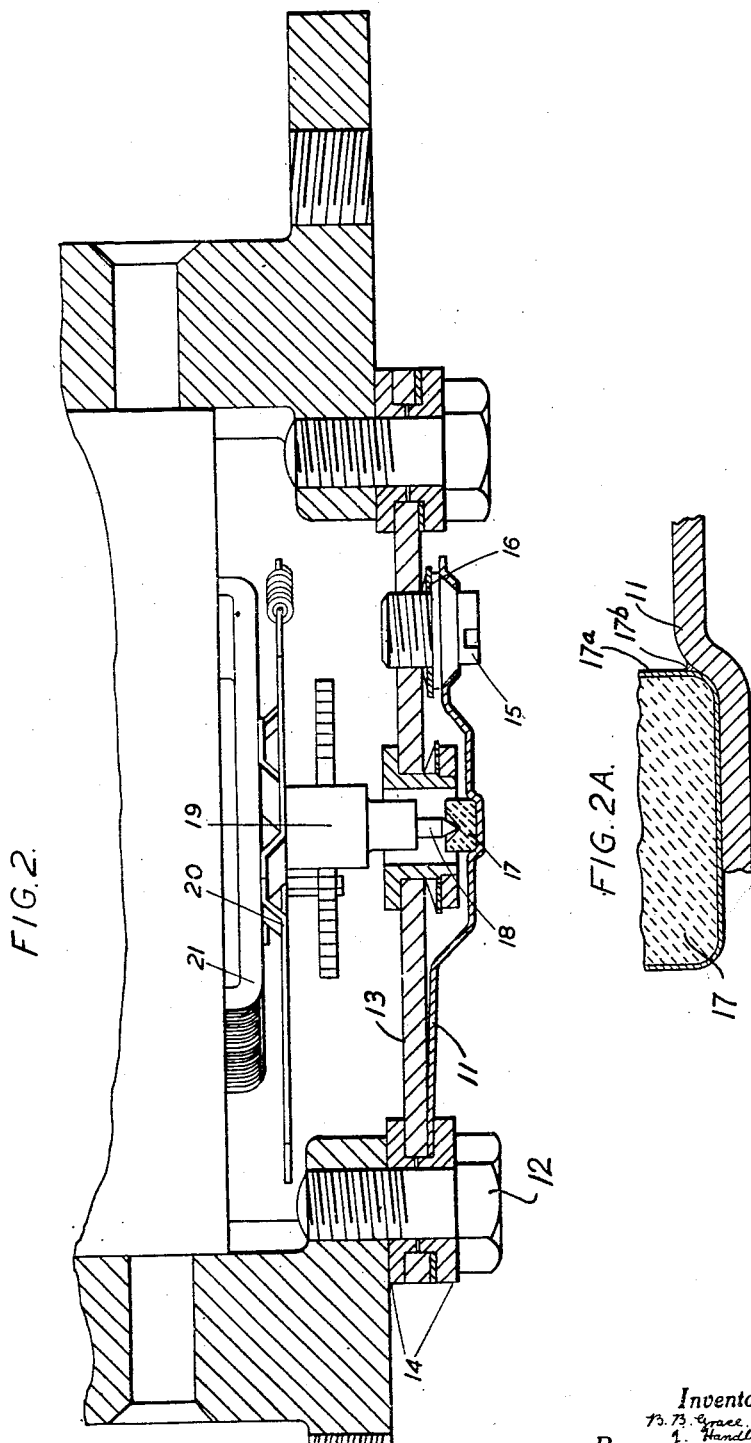

2,396,462

UNITED STATES PATENT OFFICE 2,396,462

MOUNTING JEWELS FOR INSTRUMENT BEARINGS

Bertram Barnett Grace, John Handley, and Gilbert Gilliver, London, England, assignors, by mesne assignments, to International Standard Electric Corporation, New York, N. Y., a corporation of Delaware Application June 12, 1943, Serial No. 490,626
In Great Britain July 21, 1942

7 Claims. (Cl. 308—15)

This invention refers to methods of mounting and adjusting pivots and jewels, and more particularly, although not necessarily, those used in electrical measuring instruments.

The invention consists in mounting the jewel in a metal support by first coating it with metal then soldering it to a metal support for instance a leaf spring.

The invention further consists in attaching a jewel to a thin metal support by punching a hole in the support and preferably drawing the metal up into a boss during the punching process, and providing a shoulder on the jewel and force fitting the jewel into the hole until it is home to the shoulder.

The invention also consists in reversing the position of the jewel and pivot wherein the jewel is mounted in the moving system in a recess in the base which is attached to the moving coil (in which case it may be secured by spinning over the metal surrounding it), or by fitting the jewel into a nut which is screwed on to the base and may also clamp the crossarm and pointer unit and/or the control spring anchor piece. In this case the pivot is shouldered down to a smaller diameter at its plain end and soldered or spot welded to the leaf springs.

The invention also consists in an improved adjuster for the leaf spring (which controls the permissible play in the bearings), to prevent any drag between the leaf spring and the adjuster when the instrument is subjected to shock.

The invention will now be described with reference to the accompanying drawings in which:

Fig. 1 is the front view of the mechanism for a moving coil instrument.

Fig. 2 is a plan of the front end of the same in section, to show the bearing assembly in which the jewel is attached by coating with metal and then soldering to the leaf spring.

Fig. 2A is a fragmentary view showing a part of Fig. 2 on a much larger scale.

Fig. 3 is a plan of the bearing assembly in which the jewel is shouldered and force fitted into the spring.

Fig. 4 is a plan of the bearing assembly in which the pivot is soldered or welded to the spring and the jewel is fitted into a nut which is screwed on to the base.

The leaf spring 11 is clamped by the screw 12 to the bridge piece 13 which is insulated from the main assembly by the bushes 14.

The free end of the leaf spring sits on the conical flange of the adjuster 15 with an appreciable clearance on the parallel part which is slotted for adjustment. This ensures that there shall be no drag on the leaf spring as it is lifted from the adjuster flange or returns to it, when taking a shock. A spring washer 16 retains the adjuster at any set position.

The bearing jewel 17 is first coated with metal 17a and then fixed on the spring by soldering 17b. A recess is stamped in the spring to give an accurate location.

The metal used for coating the jewel may be silver and it may be applied by the usual process associated with silvering mirrors, that is: dispersed from a negative cathode of silver charged at high voltage in a vacuum chamber.

The jewel is conically recessed to receive the pivot 18 which is fitted into the base 19. The base is rivetted into the crossarm and pointer unit 20 which in turn is cemented to the moving coil 21.

Figure 3 shows the bearing assembly again, but in this case the jewel is shouldered and the leaf spring 11 is punched out to receive the jewel and the hole drawn up into a boss. The jewel is pressed in up to the shoulder. The hole is made slightly smaller than the jewel and preferably tapered so that the boss is expanded by the jewel and grips it firmly.

In Fig. 4 the positions of the pivot and jewel are reversed, the pivot being soldered or welded to the leaf spring and the jewel is fitted into a threaded cup or nut 22 which is screwed on to the base. The jewel may be fitted directly into a hole drilled in the end of the base, but the illustrated case shows an advantage of using this nut to clamp the spring anchor piece 23 which provides a convenient method of setting the approximate zero position of the pointer, especially useful on instruments having a single control spring.

What is claimed is:

1. In a bearing assembly for measuring instruments and the like comprising a rotary spindle having a conical pivot, the combination of a resilient jewel bearing support, a jewel bearing element having a metal coating soldered to said support and formed with a conical bearing recess to receive said pivot.

2. In a bearing assembly for measuring instruments and the like comprising a rotary spindle having a conical pivot, the combination of a resilient jewel bearing support formed with a recess for a jewel bearing element, a jewel bearing element having a metal coating soldered to said support and formed with a conical bearing recess to receive said pivot, and means to limit the resilient movement of the support.

3. In an instrument spindle bearing assembly comprising a rotary spindle having a conical pivot, the combination of a resilient leaf spring bearing support secured at one end and formed with a recess for a jewel at its intermediate portion, a jewel bearing element having a metal coating soldered in said recess and formed with a conical bearing recess to receive said pivot, and means to limit the resilient movement of the support and engaging the free end thereof.

4. In an instrument bearing assembly comprising a rotary spindle having a conical pivot, the combination of a leaf spring bearing support formed with a recess for a jewel, a jewel bearing element having a metal coating soldered in said recess and formed with a conical bearing recess to receive said pivot and means to limit the resilient movement of the support consisting of a conical headed adjusting screw engaged by an apertured and countersunk free end portion of the spring support.

5. In a bearing assembly for measuring instruments and the like including a rotary spindle, a jewel unit including a jewel recessed to receive an end of said spindle, a resilient leaf spring support to which said jewel unit is secured at an intermediate point, said leaf spring support being fixed at one end, and means for regulating the resilient movement of the free end of said leaf spring support.

6. The combination set forth in claim 5 in which the regulating means comprises a stationary part with a conical outer surface and a part on the free end of said leaf spring support having an inner conical surface to engage said conical outer surface.

7. The combination set forth in claim 5 in which the regulating means comprises on the free end of the spring support an apertured portion countersunk to provide a conical interior surface facing away from the aperture and a stationary member with a cylindrical outer portion in the aperture and a conical outer surface to engage said conical interior surface.

BERTRAM BARNETT GRACE.
JOHN HANDLEY.
GILBERT GILLIVER.